May 12, 1936.　　　E. A. JOHNSTON　　　2,040,696
TRACK FOR TRACK TYPE TRACTORS
Filed Aug. 11, 1934　　　3 Sheets-Sheet 1
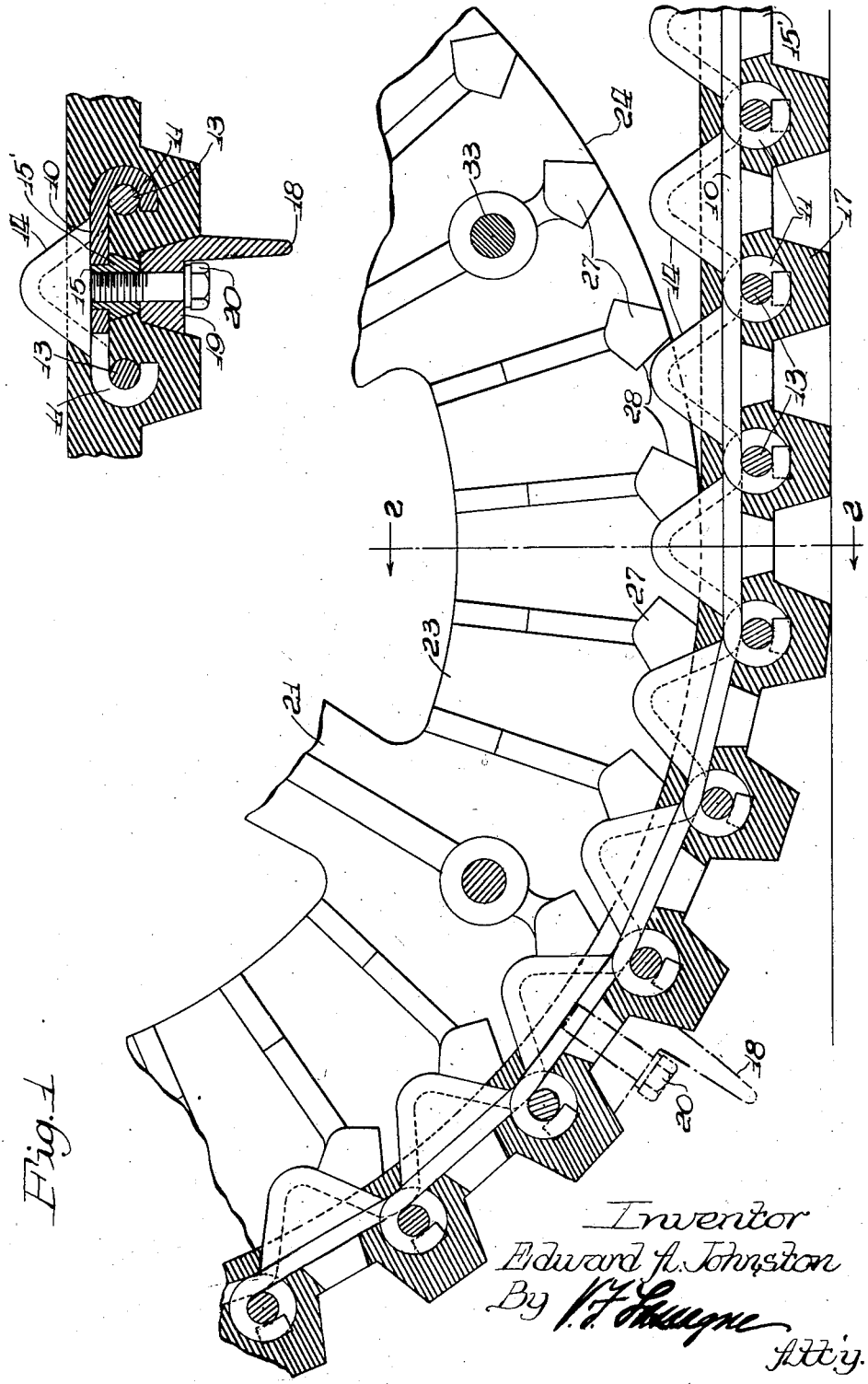
Inventor
Edward A. Johnston
By
Atty.

May 12, 1936.   E. A. JOHNSTON   2,040,696
TRACK FOR TRACK TYPE TRACTORS
Filed Aug. 11, 1934   3 Sheets-Sheet 2
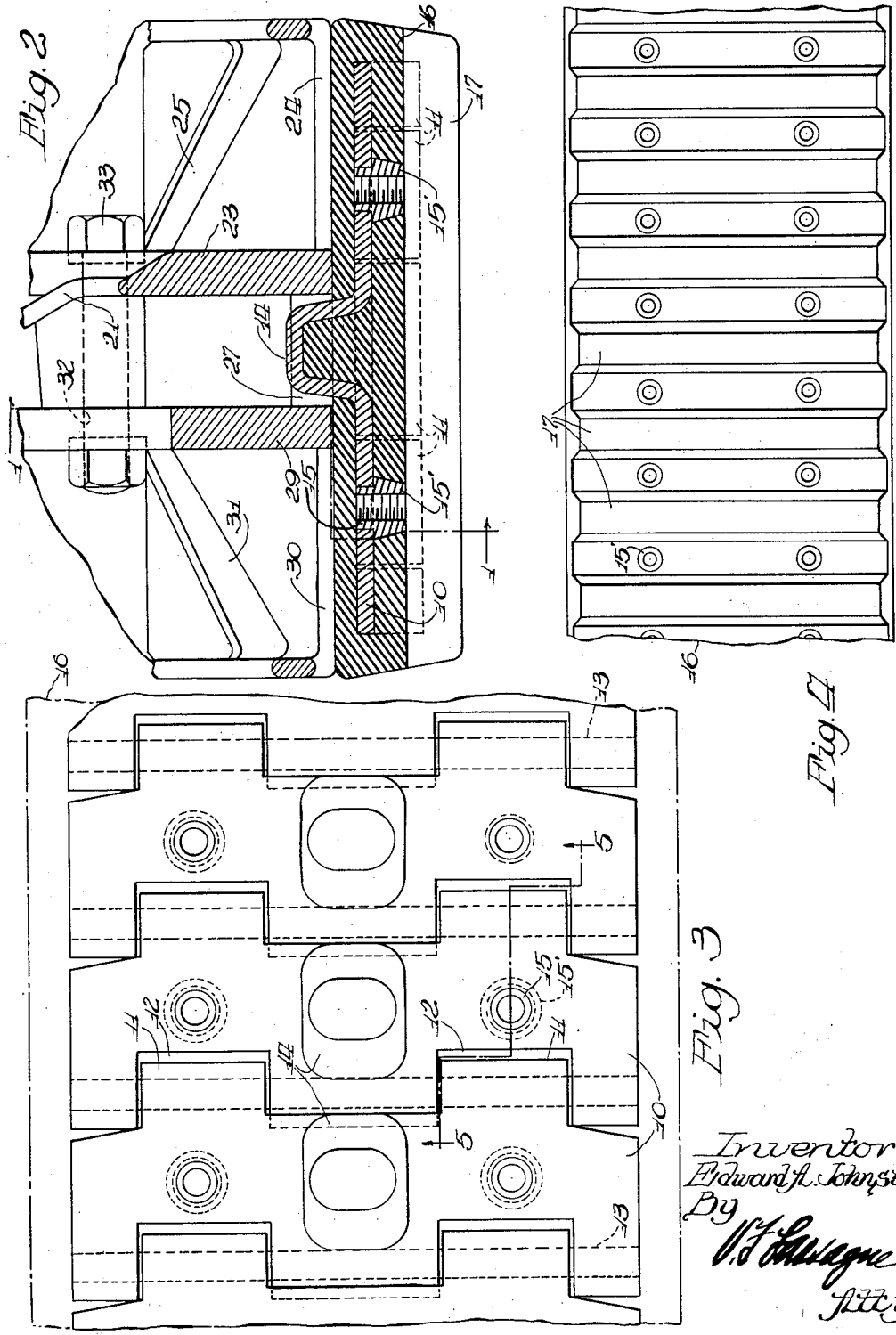

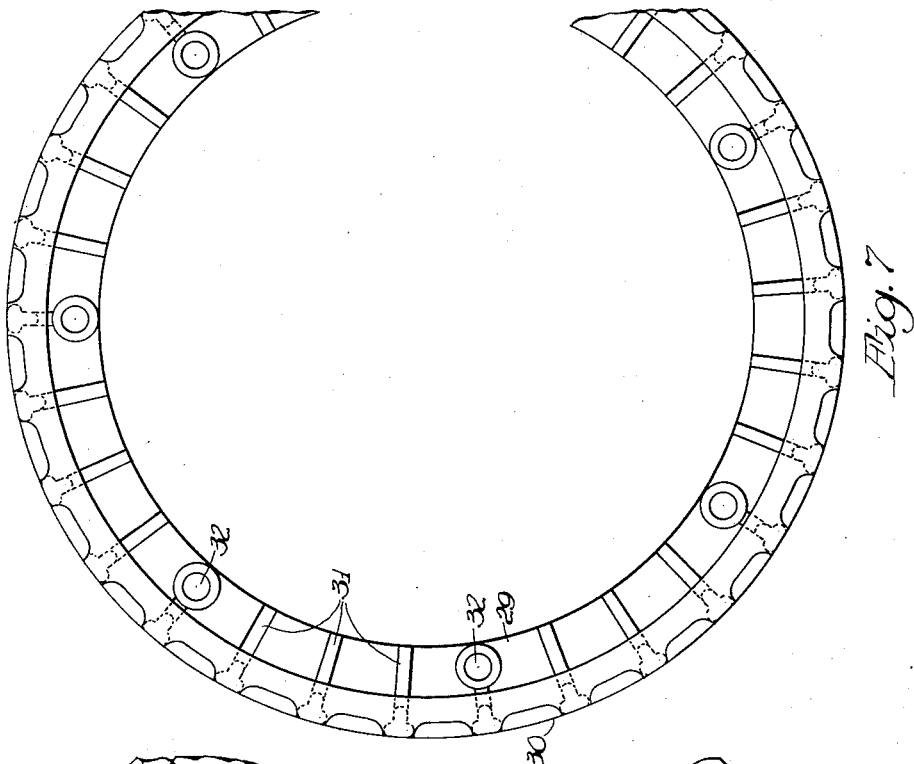
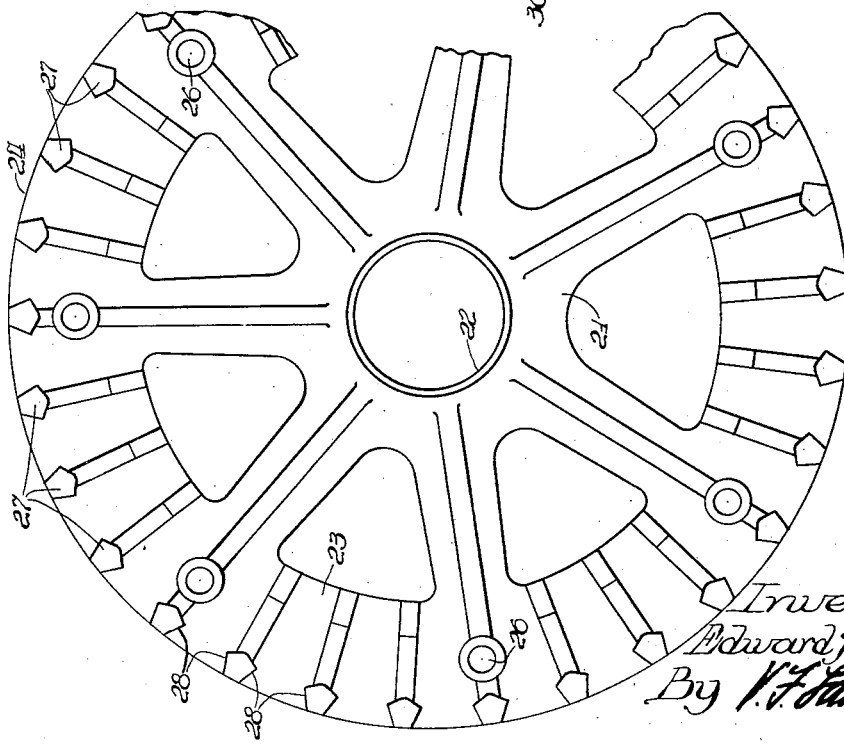

Patented May 12, 1936

2,040,696

UNITED STATES PATENT OFFICE 2,040,696

TRACK FOR TRACK TYPE TRACTORS

Edward A. Johnston, Chicago, Ill., assignor to International Harvester Company, a corporation of New Jersey Application August 11, 1934, Serial No. 739,444

4 Claims. (Cl. 305—10)

The invention relates to an endless, rubber track construction for use with track laying tractors.

Such rubber tracks have many advantages over the usual metal link tracks now commonly in use. For instance, the metal track wears badly, is noisy, and limits the speed of the tractor. On the other hand, rubber tracks, having no exposed metal hinge connections to wear, last longer; there is no clatter and noise; and, lastly, greater speeds are possible. The main trouble with rubber tracks so far produced is that they are not sufficiently durable.

Accordingly, the primary object of this invention is to provide a rubber track of ample suppleness and flexibility and which, because of its constructional reinforcement, will have all of the characteristics of rubber tracks, and, in addition, have the property of durability.

Another object is to embed in the track a novel form of metal link reinforcement to take the thrust of the driving wheel in operating the track to move the tractor.

Still another object is to provide a special form of driving wheel for the particular track construction.

Other important objects will be apparent to those skilled in this art as the disclosure is more fully made.

Briefly, these important objects may be achieved by the practicable example of the invention illustrated in the accompanying sheets of drawings, wherein an endless, flexible, metal belt, in the form of a series of pivotally connected links is provided, having interfitting portions, the links at spaced intervals between pivot centers on the inner surface of the link chain carrying driver lugs of metal to take the driving thrust of the driver wheel in operating the improved track. The metal parts thus described comprise a flexible, hinged, reinforcing insert which is placed in a suitable mold for the purpose of molding therearound a rubber covering constituting the ground engaging traction band embodying on its ground contact side spaced transverse cleats to increase the tractive effort of the track. In these drawings:

Figure 1 is a fragmentary side sectional view of the assembled track and a segment of the driver wheel taken along the line 1—1 of Figure 2, looking in the direction of the arrows;

Figure 2 is a detail transverse cross sectional view through the assembled driver wheel and track taken along the line 2—2 of Figure 1, looking in the indicated direction;

Figure 3 is a plan view of the inner surface of a section of the assembled metallic reinforcement per se;

Figure 4 is a plan view of a section of the traction side of the rubber track;

Figure 5 is a detail longitudinal sectional view through a portion of the completed track taken along the line 5—5 of Figure 3, looking in the direction of the arrows;

Figure 6 is a side elevational view of the driver wheel; and,

Figure 7 is a similar view of a rim element for the driver wheel.

The metallic reinforcement portion of the improved track, as shown in Figures 1 and 3, comprises a plurality of flat links 10 having projections 11 in spaced apart relation along its forward and rearward edges, when considering the links in their direction of travel. The spaces between projections are numbered 12. Thus, along each of said edges is a plurality of projections or tongues 11 and alternating therewith are the spaces 12. The structure is such that adjoining links may interfit between adjacent tongues to create interengaged links, as shown in Figure 3.

As shown in Figures 1 and 5, these projecting tongues in the adjacent edges of adjoining links are hooked or curled and disposed in transverse alignment to receive for insertion from one side edge of the links a transverse pivot pin 13 for pivotally and articulately connecting the links together to form a continuous articulated link belt. Along the longitudinal median line of the belt thus formed, each link is formed with a lug 14 preferably pressed out of the links in a radial direction from the inner side of the belt. These lugs are adapted to be engaged by the driving teeth of a driver wheel, later to be described, and for the purpose of causing proper engagement of the driver wheel therewith in either direction of travel of the belt, these lugs or teeth 14 are formed on their opposite forward and rearward sides with a sloped surface, as shown best in Figures 1 and 5. Said lugs 14 on the traction side of the track are hollow, as shown.

Adjacent each end or side edge of each link 10 and preferably in transverse alignment with each other, and with the lug 14, are provided drill holes, as appears in Figures 2 and 5, to receive a plug 15 having a head 15' disposed on the ground side of the link and formed larger than the said drill holes to overlap and seat on the link 10, as shown. These plugs are preferably secured in these drill holes and to the link by welding in such a manner that the plugs will be securely anchored to the links 10. Each said plug 15 is tapped with a threaded bore to receive a cap screw later to be described.

The completed metallic link belt thus formed is thereupon placed in a mold and completely embedded in a rubber coating or tread 16, the same being of substantial thickness, as shown, with only the driving lugs 14 protruding therefrom on its inner side. In the molding operation the traction side of the rubber sheath flows into and forms in the hollow lugs 14, thus helping to interlock the rubber with the metal link inserts. The ground engaging or outer side of the rubber tread is formed with spaced, transverse raised grouser, or cleat portions 17 in radial alignment with the hinges 13. This provides grooves between the grousers 17 in which the plugs 15 are located.

At times, when operating the tractor on snow or ice, or in other conditions, it is desirable to increase the tractive effort of the track, and it is then that the plugs 15 become useful by serving as means to secure traction increasing lugs or grousers 18 to the track in the manner shown in Figure 5. In the drawings, it will be seen that the lugs 18 include tapered base portions 19 shaped to fit snugly in the grooves between adjacent grouser portions 17 in the rubber tread. This base portion 19 seats against the plug 15, as shown, the portion 19 being provided with a bore to receive a cap screw 20, which threads into the plug 15 and in this manner serves securely to fasten the attachment grouser or lug 18 to the metallic link reinforcement portion of the track. Obviously, these lugs 18 are quickly attachable and detachable.

The driving wheel that drives the track is of special design and comprises, as shown in the drawings (Figure 6), a wheel 21 having a hub 22 for journaling on the usual drive shaft of the tractor, not shown. Said wheel has a radial rim 23 including a circumferential, laterally extending rim portion 24 braced by integrally formed webs 25. The radial rim part 23 at circumferentially spaced points is provided with laterally disposed holes 26. Extending laterally from the rim 23 at right angles, and oppositely from the rim or flange portion 24, and at circumferentially spaced points, are integrally formed driving teeth 27 having opposite sides sloped, as at 28, to conform to the slope on the lugs 14 of the track. This shape of the teeth 27 and complementary lugs 14 makes for a positive driving engagement between the driver wheel and track in either direction of travel of the tractor.

The driver wheel structure also includes a radial rim portion 29 having a right angularly disposed, transverse flange portion 30 braced by integral webs 31, as shown. This radial rim 29 abuts the ends of the driving teeth 27, as shown in Figure 2, and includes holes 32 adapted to register with the holes 26 in the wheel 21, so that bolts 33 may serve securely to fasten the rim 29 and wheel 21 together.

The wheel parts described thus provide the flange portions 24 and 30, around which the improved track described is wrapped, resulting in driving relationship between the lugs 14 and teeth 27, as has been described. The use and operation of the improved track is in accordance with well understood standard practice, and, therefore, a summary of its operation will not be necessary.

From this detailed description it will be seen that an improved track has been provided, which possesses all of the advantages of a rubber track and, in addition, because of the metallic link reinforcement, has the desirable characteristic of durability.

It is the intention to cover all changes not departing from the scope of the invention as hereinafter claimed.

What is claimed is:

1. A track for track type tractors comprising an endless series of substantially flat sheet metal links having adjoining edges formed with interfitting tongues and spaces, the tongues on each link being curled to provide aligned transverse bores, a continuous pivot pin inserted from one side of the links through the bores thus formed articulately to connect adjacent links together, said structure being completely embedded in a rubber sheathing, driver lugs on the links midway between their edges and projecting part way through the sheathing on the side of the track opposite to its traction side, the traction side of the sheathing having formed thereon alternate transverse grooves and cleats, the links on opposite sides of said lugs carrying means for anchoring traction grousers thereto, said means being in vertical line with the grooves in the rubber sheathing when the track lies flatly on the ground.

2. A track for track type tractors comprising an endless series of substantially flat sheet metal links having adjoining edges formed with interfitting tongues and spaces, the tongues on each link being curled to provide aligned transverse bores, a pivot pin inserted from one side of the links through the bores thus formed articulately to connect adjacent links together, said structure being completely embedded in a rubber sheathing, hollow driver lugs on the links substantially midway between their side edges and pressed therefrom to project part way through the sheathing on the side of the track opposite to its traction side, the traction side of the sheating being molded into said hollow lugs and having its ground engaging portion formed with alternate transverse grooves and cleats.

3. A track for track type tractors comprising an endless series of substantially flat sheet metal links having adjoining edges formed with interfitting tongues and spaces, the tongues on each link being curled to provide aligned transverse bores, a pivot pin inserted from one side of the links through the bores thus formed articulately to connect adjacent links together, said structure being completely embedded in a rubber sheathing, driver lugs on the links midway between their edges and projecting part way through the sheathing on the side of the track opposite to its traction side, the traction side of the sheathing having formed thereon alternate transverse grooves and cleats, the links on opposite sides of said lugs carrying threaded socket members for detachably securing traction grousers thereto, said socket members being in vertical line with the grooves in the rubber sheathing when the track lies flatly on the ground.

4. A track for track type tractors comprising an endless series of substantially flat sheet metal links having adjoining edges formed with interfitting tongues and spaces, the tongues on each link being curled to provide aligned transverse bores, a continuous pivot pin inserted from one side of the links through the bores thus formed articulately to connect adjacent links together, said structure being completely embedded in a rubber sheathing, driver lugs on the links substantially midway between their edges and projecting part way through the sheathing on the side of the track opposite to its traction side, the traction side of the sheathing having formed thereon alternate transverse grooves and cleats, the links on opposite sides of said lugs carrying means for anchoring traction grousers thereto, said lugs and means being transversely aligned on each link and the lugs and means being also in vertical line with the grooves in the rubber sheathing when the track lies flatly on the ground.

EDWARD A. JOHNSTON.